United States Patent [19]

Hewinson et al.

[11] Patent Number: 4,670,870

[45] Date of Patent: Jun. 2, 1987

[54] ADAPTIVE CANCELLATION BRIDGE CIRCUIT

[75] Inventors: John Hewinson; John A. Stockdale, both of Poole, England

[73] Assignee: Plessey Overseas Limited, Ilford, England

[21] Appl. No.: 725,539

[22] Filed: Apr. 22, 1985

[51] Int. Cl.⁴ .................. H04L 5/14; B60K 31/00
[52] U.S. Cl. ............................. 370/28; 370/32; 375/14; 379/402
[58] Field of Search .................. 370/28, 24, 32; 179/170.2, 170.6, 170.8; 375/14

[56] References Cited

U.S. PATENT DOCUMENTS

| | | | |
|---|---|---|---|
| 3,781,720 | 12/1973 | Mueller | 375/14 |
| 4,074,087 | 2/1978 | Blake, Jr. et al. | 179/170.2 |
| 4,355,214 | 10/1982 | Levy et al. | 179/170.2 |
| 4,389,727 | 6/1983 | Rouffet | 375/14 |

Primary Examiner—Douglas W. Olms
Assistant Examiner—Wellington Chin
Attorney, Agent, or Firm—Fleit, Jacobson, Cohn & Price

[57] ABSTRACT

The invention relates to an adaptive cancellation bridge circuit (ACB) for use in a single medium full duplex line termination equipment such as modems where signals are transmitted and received simultaneously along a pair of wires, the transmit and receive signal being separated in frequency. The bridge comprises a bridge network including transconductance cells (TC1, TC2 and TC3), to provide resistive, capacitive, and inductive components and these cells are electronically controlled by a current control device CC driven from a received signal (RXS) inphase and quadrature components to adjust the bridge network so that it becomes balanced and cancels a transmit signal (TXB) completely.

9 Claims, 3 Drawing Figures

4,670,870

ADAPTIVE CANCELLATION BRIDGE CIRCUIT

This invention relates to an adaptive cancellation bridge circuit for use in telecommunications systems.

The invention finds particular, although not exclusive, utility in single medium full duplex line terminating equipment such as modems, where signals are transmitted and received simultaneously along a pair of wires, the transmit and receive signals being separated in frequency.

When the line attenuation is high the transmitted signal level can be much higher than the received signal level and expensive filtering is required to separate the received signal.

This is usually improved by using a bridge or equivalent circuit, of which the transmission line forms one arm. Due to variations in the impedance of the line the improvement obtained is limited—about 10dB is typical.

SUMMARY

According to the invention there is provided an adaptive cancellation bridge circuit comprising transconductance cells providing resistive, capacitive and inductive components in a bridge network wherein the transconductance cells are controlled by a current control device driven from inphase and quadrature signal components derived from a transmit signal and extracted from the bridge network to adjust the effective resistance, capacitance and inductance of the cells to balance the bridge network, and cancel the transmit signal.

The method to be described uses a bridge network or equivalent circuit in which the resistive and reactive components of one or more of the arms can be electronically varied. Phase sensitive detectors detect components of the transmitted signal in the bridge network output, which can then be automatically nulled out by varying the bridge values.

This greatly improves the effectiveness of the bridge circuit, resulting in improved performance and/or reduced costs, due to simplicication of the transmit and receive filter requirements.

BRIEF DESCRIPTION OF THE DRAWINGS

The invention will be more readily understood from the following description of an exemplary embodiment which should be read in conjunction with the accompanying drawings in which;

FIG. 2 shows the circuit diagram of a transconductance cell, together with a schematic of the impedance of each cell, for use in the adaptive cancellation bridge of FIG. 1; while.

DETAILED DESCRIPTION

Figure 2:
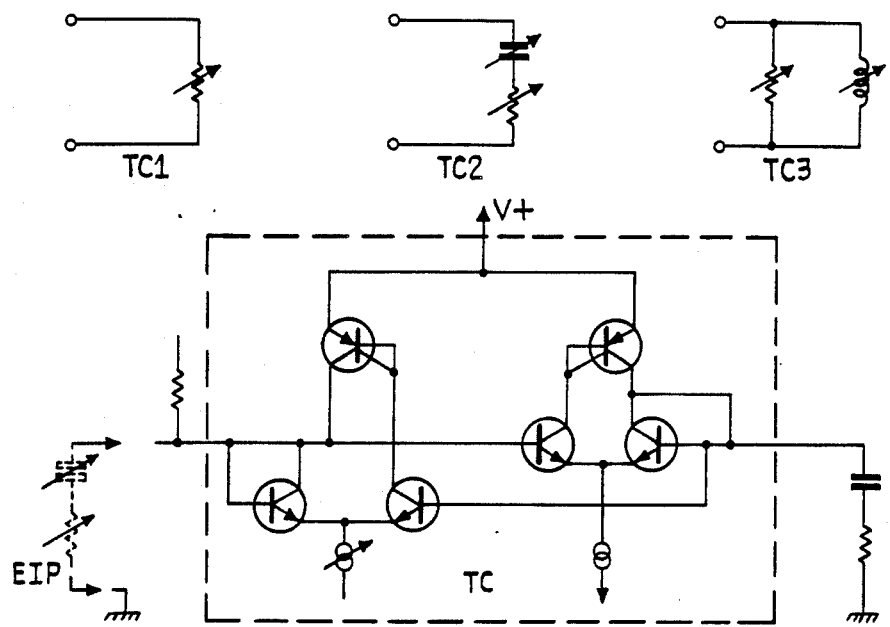

Referring now to the drawings, it should be appreciated that the principle of operation of the adaptive cancellation bridge ACB involves the employment of the transconductance cells TC1, TC2 and TC3 (FIG. 2) in one arm of a bridge network, while another arm is represented by a line L. The other two arms comprise resistors R1 and R2. Each cell is a variable-gain current amplifier which is arranged to produce variable impedances. The equivalent input impedance of such a device is indicated at EIP.

The adaptive cancellation bridge circuit is arranged to separate a received signal RXS from a transmitted signal TXS. To achieve this, a cancelling component signal, derived from the transmitted signal, appears on the right-hand side of the bridge network in FIG. 1 (terminal 4). This cancelling component signal is taken to a phase splitter means P and two amplifiers A and B to produce squared-up signal components, in phase (0°) and in quadrature (90°), with the cancelling component signal.

These signals go to four quadrant multiplying means at D and E which act as phase sensitive detectors, detecting any out-of-balance components of the transmitted signal remaining on the received signal RXS. The outputs of D and E, representing the in-phase and quadrature signal components, are integrated by integrating means C1 and C2, to produce first and second integrated signals respectively (resistors R3 and R4 provide additional smoothing). The first and second integrated signals are fed to a current control device CC by way of operational amplifies F and G respectively.

In the current control device, the amplitude of the in-phase component is used to control the overall magnitude of the transconductance cell TC1, TC2 and TC3 control currents, while the out-of-phase, or quadrature, component is used to control a proportion of current applied to each cell.

A 'centre value' of the integrator stage output R4, C, F2 relating to the quadrature component causes most of the current to go to the transconductance cell TC1 which forms the resistive element, and the remaining current to the other two transconductance cells TC2 and TC3. A more positive output with respect to the 'centre value' causes proportionately more current to go to the transconductance cell TC2 which forms the capacitive element whereas a more negative output with respect to the 'centre value' causes proportionately more current to go to the transconductance cell TC3 which forms the inductive element.

Using this technique the bridge network becomes balanced and the transmit signal TXS is completely cancelled.

Figure 1:
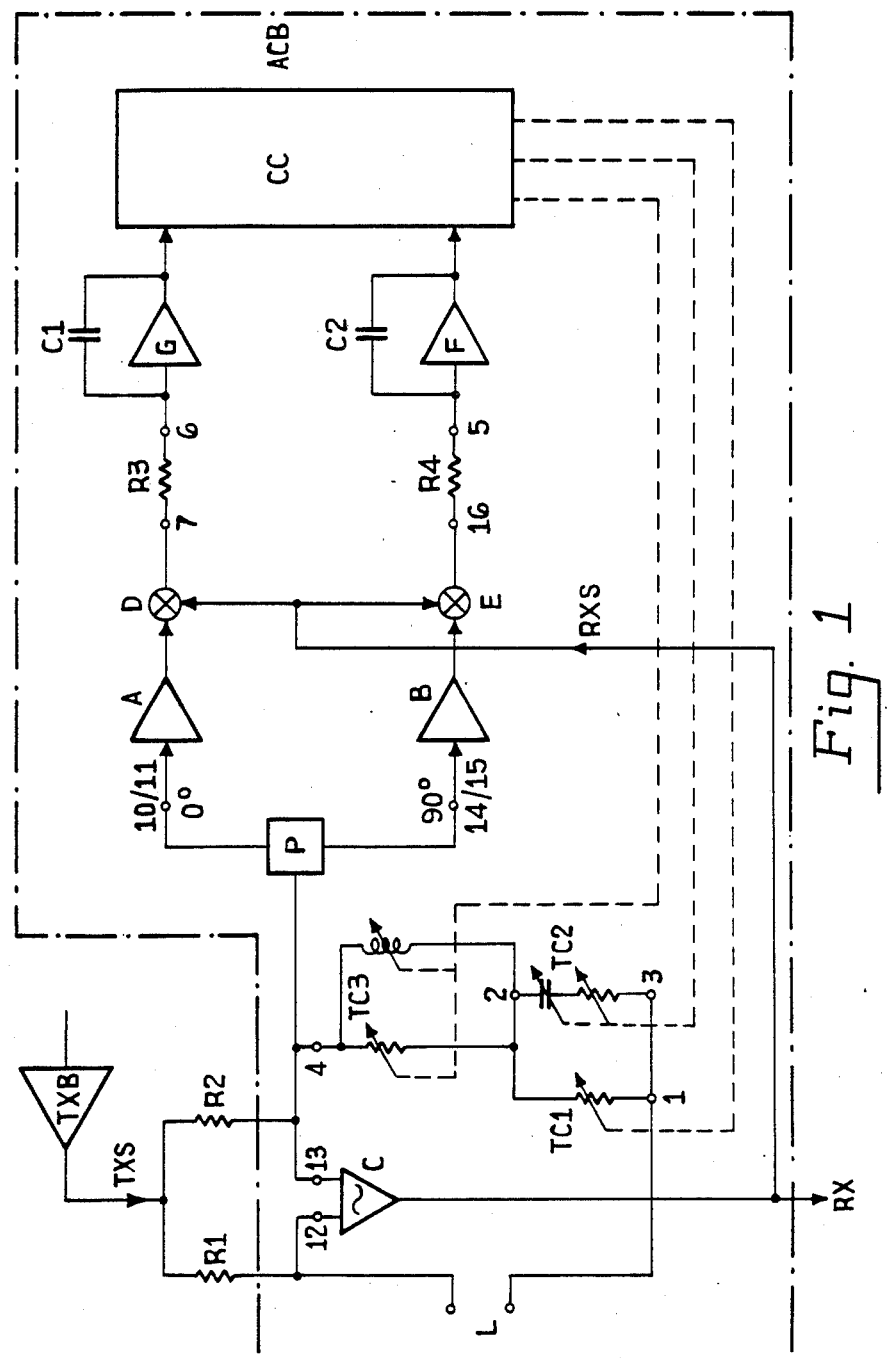
FIG. 1 shows an adaptive cancellation bridge according to this invention.
Figure 3:
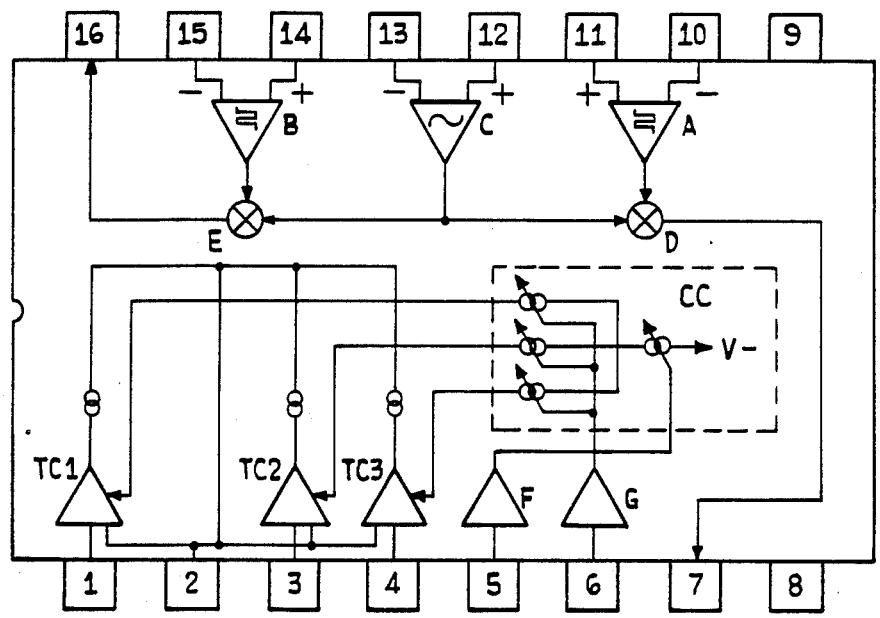
FIG. 3 shows lay-out of a typical linear array integrated circuit chip for the arrangement of FIG. 1.

The integrated chip concerned with the circuit of FIG. 1 is shown in FIG. 3 in which a voltage supply can be connected to terminals 8 and 9.

It is envisaged that an alternative embodiment of the invention could involve in addition to arrangements described, the inclusion of a transconductance cell or cells in a further arm of the bridge network, for instance, in place of or in addition to resistor R2.

It should be understood that although the invention has been devised for use on two-wire transmission systems, it could also be applied to two-way communication arrangements on other media, such as inductive loops, and with certain limitations, to systems where the transmit and receive signals occupy the same, or overlapping, frequency bands.

Further, an adaptive cancellation bridge circuit including multiple elements and more complex current control loops could be employed for use in wider band systems, for instance, echo cancelling on digital speech circuits.

We claim:

1. An adaptive cancellation bridge circuit comprising in combination:

a bridge network including transconductance cells providing resistive, capacitive and inductive components;

a current control device for controlling said transconductance cells;

a phase splitting means for producing an in-phase signal component and a quadrature signal component from a cancelling component signal derived from a transmit signal and being extracted from the bridge network, first and second multiplying means acting as phase sensitive detectors, the first multiplying means being adapted to detect said in-phase signal component and said second multiplying means being adapted to detect said quadrature signal component; and, first and second integrating means for producing first and second integrated signals, said first integrated signal being produced from said in-phase signal component and said second integrated signal being produced from said quadrature signal component;

wherein said current control device is driven, by said first integrated signal to control an overall magnitude of control currents of said transconductance cells, and by said second integrated signal to control a proportion of control current applied to each said transconductance cell to adjust said resistance, capacitance and inductive components of said transconductance cells to balance said bridge network and cancel the transmit signal.

2. An adaptive cancellation bridge as claimed in claim 1 in which a 'centre value' of said second integrated signal causes most of said control current to go to the transconductance cell which forms the resistive component and control current remaining to go to the transconductance cell which forms the capacitive component and the transconductance cell which forms the inductive component.

3. An adaptive cancellation bridge circuit as claimed in claim 2, in which when said second integrated signal becomes more positive with respect to the 'centre value', proportionately more control current goes to the transconductance cell which forms the capacitive component.

4. An adaptive cancellation bridge circuit as claimed in claim 2, in which when said second integrated signal becomes more negative with respect to the 'centre value', proportionately more control current goes to the transconductance cell which forms the inductive component.

5. An adaptive cancellation bridge circuit as claimed in claim 2, in which said current control of the transconductance cells balances the bridge network to cancel the transmit signal.

6. An adaptive cancellation bridge circuit as claimed in claim 2, in which said transconductance cells are included in at least one arm of said bridge network and a further arm includes a transmission line.

7. An adaptive cancellation bridge circuit, as claimed in claim 1, in which said transconductance cells are variable-gain current amplifiers.

8. An adaptive cancellation bridge circuit as claimed in claim 7, in which said variable gain current amplifiers produce variable impedances.

9. An adaptive cancellation bridge circuit as claimed in claim 1 for use in a single medium, full duplex transmission line terminating equipment.

* * * * *